United States Patent
Welsch et al.

(10) Patent No.: US 9,068,062 B2
(45) Date of Patent: Jun. 30, 2015

(54) PROCESS FOR PREPARING STABLE STARCH DISPERSIONS

(75) Inventors: Gregory W. Welsch, Midland, MI (US); Michael D. Read, Midland, MI (US); John A. Roper, III, Midland, MI (US); Brian J. Ninness, Midland, MI (US); Evelyn L. Wilson, Bentley, MI (US)

(73) Assignee: Dow Global Technologies LLC

( * ) Notice: Subject to any disclaimer, the term of this patent is extended or adjusted under 35 U.S.C. 154(b) by 388 days.

(21) Appl. No.: 13/514,380

(22) PCT Filed: Dec. 2, 2010

(86) PCT No.: PCT/US2010/058690
§ 371 (c)(1),
(2), (4) Date: Jun. 7, 2012

(87) PCT Pub. No.: WO2011/071742
PCT Pub. Date: Jun. 16, 2011

(65) Prior Publication Data
US 2013/0000514 A1    Jan. 3, 2013

Related U.S. Application Data

(60) Provisional application No. 61/285,404, filed on Dec. 10, 2009.

(51) Int. Cl.
| | | |
|---|---|---|
| C09D 103/00 | (2006.01) | |
| C08L 3/02 | (2006.01) | |
| C08B 31/00 | (2006.01) | |
| C09D 103/02 | (2006.01) | |
| D21H 19/54 | (2006.01) | |
| D21H 21/52 | (2006.01) | |

(52) U.S. Cl.
CPC ............ *C08L 3/02* (2013.01); *C08B 31/003* (2013.01); *C09D 103/02* (2013.01); *D21H 19/54* (2013.01); *D21H 21/52* (2013.01)

(58) Field of Classification Search
None
See application file for complete search history.

(56) References Cited

U.S. PATENT DOCUMENTS

| | | |
|---|---|---|
| 4,139,699 A | 2/1979 | Hernandez et al. |
| 5,539,021 A | 7/1996 | Pate et al. |
| 6,242,593 B1 | 6/2001 | Bloembergen et al. |
| 6,340,527 B1 | 1/2002 | Van Soest et al. |
| 6,355,734 B1 | 3/2002 | Cassar et al. |
| 6,677,386 B1 | 1/2004 | Giezen et al. |
| 6,755,915 B1 | 6/2004 | Van Soest et al. |
| 6,825,252 B2 * | 11/2004 | Helbling et al. ............... 524/47 |
| 6,921,430 B2 | 7/2005 | Bloembergen et al. |
| 7,160,420 B2 | 1/2007 | Helbling et al. |
| 7,276,126 B2 | 10/2007 | Nehmer et al. |
| 2001/0008635 A1 | 7/2001 | Quellet et al. |
| 2004/0011487 A1 | 1/2004 | Helbling et al. |
| 2004/0231559 A1 | 11/2004 | Bloembergen et al. |
| 2004/0241382 A1 | 12/2004 | Bloembergen et al. |
| 2005/0061203 A1 | 3/2005 | Helbling et al. |
| 2006/0246192 A1 | 11/2006 | Dukic et al. |
| 2008/0036115 A1 | 2/2008 | Ueda et al. |
| 2009/0117376 A1 | 5/2009 | Bloembergen et al. |
| 2011/0042841 A1 | 2/2011 | Wildi et al. |

FOREIGN PATENT DOCUMENTS

| | | |
|---|---|---|
| DE | 4143132 | 7/1993 |
| GB | 1567234 | 5/1980 |
| WO | 02074814 | 9/2002 |

OTHER PUBLICATIONS

Krogars, et al., "Development and characterization of aqueous amylose-rich maize starch dispersion for film formation", European Journal of Pharmaceutics and Biopharmaceutics, vol. 56, No. 2, Sep. 1, 2003, pp. 215-221.

Horiba Instruments, Inc., "A Guidebook to Particle Size Analysis", Horiba Scientific, 2014, pp. 1-29.

* cited by examiner

*Primary Examiner* — Melissa Swain

(57) ABSTRACT

A process for the preparation of a dispersion of starch in an hydroxylic liquid, the process comprising introducing a feed starch and an hydroxylic liquid to an extruder, and applying shear forces in the extruder to the starch and the liquid under conditions sufficient to prepare a stable dispersion of starch particles in the hydroxylic liquid.

12 Claims, No Drawings

PROCESS FOR PREPARING STABLE STARCH DISPERSIONS

CROSS-REFERENCE TO RELATED APPLICATIONS

This application claims priority from U.S. provisional application Ser. No. 61/285,404, filed Dec. 10, 2009, which is incorporated herein by reference in its entirety.

BACKGROUND OF THE INVENTION

The disclosure relates to a process for extruding starch.

Starch has been extruded in the past. For example, starch has been processed in extruders in the food industry to produce cooked starch. In addition, starch has been extruded to produce starch pellets. It is also known that starch can be extruded in the presence of a cross-linker. The cross-linker is necessary in the processes of the prior art to increase the viscosity of the starch in the extruder.

It would be desirable to have a process that would not require the use of crosslinking chemistry for producing starch based dispersions.

SUMMARY OF THE INVENTION

Disclosed is a process for the preparation of a dispersion of starch in an hydroxylic liquid, the process comprising:

introducing a feed starch and an hydroxylic liquid to an extruder, and applying shear forces in the extruder to the starch and the liquid in the substantial absence of a cross-linker under conditions sufficient to prepare a stable dispersion of starch particles in the hydroxylic liquid.

In one embodiment, the disclosure provides a process for the preparation of an aqueous starch dispersion, the process comprising:

introducing a feed starch and an aqueous liquid to an extruder wherein the extruder is connected to a back pressure regulator device at its outlet, applying shear forces in the extruder to the starch and the liquid in the substantial absence of a cross-linker, and recovering a stable aqueous dispersion of starch particles.

The starch dispersions of this disclosure may be advantageously employed in applications, such as paper coating, where high binding strength is desired. Surprisingly, starch dispersions made with the cross-linker free process are far less susceptible to bacterial contamination. The process of this disclosure can provide stable dispersions with excellent shelf life.

DETAILED DESCRIPTION OF THE INVENTION

The disclosed process employs starch, a hydroxylic liquid, and an extruder to prepare a unique product. Advantageously, the disclosed process produces starch-based dispersions utilizing an extrusion process without the use of crosslinking chemistry.

For the purposes of this disclosure, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc.

For the purposes of this disclosure, a stable dispersion is defined as one which passes the Stability Test as outlined below.

For the purposes of this disclosure, specific mechanical energy (SME) is defined as the net input of mechanical energy by the extruder drive per unit mass of material flowing through the system. The units of SME typically are J/g.

The feed starch can be selected from any of a wide variety of sources including corn, potato, tapioca, rice, wheat, barley, etc., including waxy, native, and high amylose starches. Many starches are commercially available. Mixtures of starches can be employed. In one embodiment, the feed starch is unmodified native starch. Other feed starches include starches that have been purposefully modified in order to deliver other benefits such as, for example, carboxylated starches, hydroxyethylated starches, resistant starches, thermally oxidized starches, dextrin type, etc.

The feed starch can be utilized as a dry feed to the extruder or as a prewetted material. When feeding dry starch, a suitable quantity of hydroxylic liquid, preferably water, can be continuously or intermittently fed early in the process to provide a wetting medium for the feed starch particles. When utilizing a mixture of hydroxylic liquid and starch as the feed to the extruder, the solids content can vary widely. For example, it is possible to use a milled starch that has not been dried, e.g. a filter cake, a slurry, etc, as a feed material. It is possible to feed the liquid to a stage of the extruder that is later than the stage to which the starch is fed, which is preferred, and vice versa.

The hydroxylic liquid is preferably selected from water, an alcohol and mixtures thereof. Advantageously, the liquid is employed in an amount sufficient to provide a mixture that is workable in the extruder. In one embodiment, the amount of liquid employed in the extruder is from about 40 weight percent, based on the weight of the liquid and the starch, to about 60 weight percent. In one embodiment, the amount of liquid employed is from about 45 weight percent, based on the weight of the liquid and the starch, to about 55 weight percent. "Dry" starch typically is provided by the starch manufacturer with some amount of water in it, which can be, for example, around 8 to 14%. That water is counted as hydroxylic liquid in the determination of the amount of liquid in the extruder, and the weight of water is excluded from the calculation of the dry weight of the starch.

In one embodiment, optional additives can be employed. For example, a plasticizer may be present in addition to the hydroxylic liquid. Examples of plasticizers include a polyol (e.g. ethylene glycol, propylene glycol, polyglycols, glycerol, sucrose, maltose, maltodextrins, and sugar alcohols such as sorbitol), urea, sodium lactate, amino acids, or citric acid esters, at a level of from 5 to 40% by weight based on the dry weight of the starch. However, water can already act as a plasticizer. The total amount of plasticizers (i.e. water and additional plasticizer) preferably is from 5 to 50% by weight based on the dry weight of the starch or mixture of starch and other biopolymer, if used. A lubricant, such as lecithin, other phospholipids or monoglycerids, may also be present, preferably at a level of 0.5 to 2.5% by weight based on the dry weight of the starch. A molecular weight reducing acid modifier, preferably a solid or semi-solid organic acid, such as maleic acid, maleic anhydride, citric acid, oxalic acid, lactic acid, gluconic acid, or a carbohydrate-degrading enzyme, such as amylase, may be present at a level of 0.01 to 5% by weight based on the weight of the starch. While not wishing to be bound by any theory, the acid modifier or enzyme is believed to assist in slight depolymerization which is assumed to be advantageous in the process of producing starch dispersions comprising particles of a specific size.

The process starting materials comprise starch and a hydroxylic liquid, and optional additives. The feed starch can be processed from a dry or pre-wetted state using shear forces in the presence of the hydroxylic liquid. In one embodiment, the process for preparing a dispersion of starch in the liquid advantageously employs an extruder, preferably a co-rotating twin screw extruder. Advantageously, the feed to the extruder is substantially free of a cross-linker. Advantageously, the materials in the extruder contain substantially no cross-linker.

Any suitable extruder can be employed. Extruders are well-known to those skilled in the art and can be designed in various ways. Preferably, the extruder is a co-rotating, self wiping twin screw extruder. In one embodiment, the barrel of the extruder is formed from barrel sections that are bolted, or otherwise fastened, together. Advantageously, the extruder is equipped with temperature control zones. The extruder screw design is advantageously set up to provide kneading and shearing of the contents early in the extruder and distributive mixing late in the extruder. In one embodiment, the extruder has multiple injection points along the length of the machine for liquid injection.

Advantageously, the extruder is equipped with a means for ensuring that the material in the extruder is subjected to the desired amount of SME. For example, the extruder can be provided with a back pressure regulator, which is preferred, or a suitable die plate. These devices are well-known to those skilled in the art. A back pressure regulator is preferred as it provides a simple means of varying the pressure in the extruder. The back pressure regulator can be used to maintain a constant discharge pressure in the extrusion system. The back pressure regulator can impose a variable pressure drop via a spring loaded restriction or mechanical restriction in the flow path. A twin-screw extruder is typically run in a partially filled mode, but a restriction imposed by a die plate or back pressure regulator valve at the end of the extruder will cause the end of the extruder to fill completely with material. As the pressure at the exit is raised, the length of the filled region increases. The back pressure regulator provides a rapid means of setting the discharge pressure to a specific value that results in different fill lengths of the extruder. Increasing the length of the filled section increases both the residence time in the extruder and provides more mechanical energy input to the material.

The processing in the extruder is preferably performed at elevated temperatures above room temperature and below the degradation point of the starch. The temperature ranges from 25° C., preferably 30° C. more preferably 40° C. and most preferably 60° C. to at most 140° C. preferably at most 130° C., more preferably at most 120° C., and most preferably at most 110° C. The process is conducted in a manner such that in one embodiment at least 100 J of SME per g of starch is applied, while in other embodiments at least 250 J/g, and at least 500 J/g can be employed, depending on the rheology of the extruder contents. Pressure such as, for example, between 1.5 and 13 bar, may be applied to facilitate processing. In other embodiments, the pressure can be from 3 to 12 bar, or from 5 to 10 bar.

Following extrusion, the starch dispersion can be transferred to a separate vessel with mechanical agitation means where additional water may be added to alter the solids content to any desired level less than the exit solids concentration. In one embodiment, the process can include a step wherein at least part of the liquid of the dispersion is removed, e.g. by centrifugation, spray drying, pressurized filtration, membrane filtration and other known methods, to increase the solids content.

The disclosed process can be employed to make starch dispersions having various desirable characteristics. For example, the number average particle size of the starch particles in the product dispersion can be from about 0.02 to about 0.4 microns as measured using transmission electron microscopy. Light scattering techniques are not effective for determining particle size of these materials as the materials appear to loosely agglomerate, giving inaccurate results. In one embodiment, the average particle size is from about 0.05 to about 0.2 microns. These dispersions have very low viscosity relative to conventional starch solutions at the same solids levels.

The molecular weight of the starch can be adjusted over a wide range using known techniques by varying processing conditions and by using additives as described hereinabove. High molecular weight is feasible due to the particulate nature of the starch. In one embodiment, the product starch dispersion is stable, with "stable" being defined hereinbelow in the description of the Stability Test. The average molecular weight of the starch particles advantageously is lower than the average molecular weight of the feed starch.

The solids content of the starch dispersion advantageously is, in various embodiments, at least about 15% by weight, at least about 35%, at least about 40%, or at least about 45%, and advantageously is at most about 60%, at most about 55%, or at most about 50%. Any combination of upper and lower limits is possible. In various embodiments, the solids content is from about 35 to about 60%, and can be from about 45 to about 55%. The viscosity of the dispersion advantageously is not more than 1,000 mPa·s, and in various embodiments can be not more than 800 mPa·s, not more than 600 mPa·s or not more than 400 mPa·s. The viscosity of the dispersion advantageously is not less than 1 mPa·s, and in various embodiments can be not less than 5 mPa·s, or not less than 10 mPa·s. These viscosities can be found over a wide range of solids contents. In one embodiment, the viscosity is not more than about 1,000 mPa·s at a solids content of from about 40 to about 50%. In one embodiment, the material is ready to use out of the extruder as is, as this advantageously reduces the expense associated with drying steps required by some prior art processes to concentrate the material into a powder form. Ideally, the material is ready to use out of the extruder as this reduces unnecessary drying steps required to concentrate the material into a powder form. However, it is possible to treat the product coming out of the extruder further to concentrate the product or prepare dry powder-like material for redispersion later. For example, in one embodiment, the dispersion is dried for redispersion later. Various means for reducing the liquid content of dispersions are known to those skilled in the art. Examples of these means include air drying, forced air drying, spray drying, centrifugation, and pressurized filtration.

The dispersion may be employed in any existing application where starch or latex is used. For example, the dispersion can be used in paper coating. Paper coating formulations can be prepared substituting wholly or partially the starch dispersion material for other conventional binders such as latex and conventional coating starches. Surprisingly, better shelf life is among the significant advantages of the disclosed starch dispersions.

Specific Embodiments of the Invention

The following examples are given to illustrate the invention and should not be construed as limiting its scope. All parts and percentages are by weight unless otherwise indicated.

Test Methods

Stability Test

A sample of the extruded material is taken and is allowed to cool to room temperature. The Brookfield viscosity is measured one day later. After 7 days, the Brookfield viscosity is measured again and the sample is observed visually to see whether the sample has gelled. A stable dispersion is one that has not formed a gel when observed 7 days after extrusion. For the purposes of this disclosure, the term 'does not form a gel' means the dispersion does not gel, i.e. does not form a material that is a viscous semisolid jelly-like, or more solid, product. A gel will typically not provide a measurement via the Brookfield rheometer. A "very stable dispersion" is a stable dispersion that has a viscosity, measured 7 days after extrusion, that is no higher than the viscosity measured 1 day after extrusion.

Brookfield Viscosity

The viscosity is measured using a Brookfield RVT viscometer (available from Brookfield Engineering Laboratories, Inc., Stoughton, Mass., USA). For viscosity determination, a sample is poured into a suitably large container to avoid edge effects between the wall and the spindle. The viscosity is measured at 25° C. with a variety of spindle sizes and rotation speeds depending on the characteristics of the sample being measured.

Particle Size

Particle size measurements are obtained utilizing a transmission electron microscope (TEM). Samples are diluted with water and then aspirated onto 400 mesh FORMVAR-coated TEM grids. The grids are immediately placed into a Gatan cryo-transfer holder that is pre-cooled with liquid nitrogen, and then inserted into an FEI-Philips Tecnai 12 TEM operating at 120 keV. The cryo-transfer holder enables the samples to be kept cold and condensation-free while being inserted into the microscope. The holder is warmed to −90° C. and images are recorded digitally using a Gatan Multiscan CCD camera. Particle diameters are then manually measured utilizing a drawing tool. A minimum of forty particles are measured and then the average particle size is calculated.

Molecular Weight

Molecular weight measurements are obtained utilizing size exclusion chromatography (SEC). Molecular weight averages are based on calibration with polyethylene oxide standards. A calibration curve, log M versus retention time, is fit with third order polynomial. The column set is GMH6 from Toso Baas and the solvent/eluent is N,N-dimethylacetamide with LiCl. Samples are heated to 100° C. for approximately 20 hours with shaking. The starch solution concentration is targeted to be 2.5 to 3.0 mg/ml based on nominal % solids. The SEC injection volume is 100 microliters and the flow rate is 1 ml/minute. Detection is by differential refractive index.

Sheet Gloss

Sheet gloss is measured using a Technidyne T-480 instrument, available from Technidyne Corporation, at an incident angle of 75°. Sheet gloss is a property that describes coated paper's shiny or lustrous appearance and is a measurement of a sheet's surface reflectivity.

Sheet Brightness

Sheet brightness is measured using a Technidyne T-480 instrument available from Technidyne Corporation. Brightness is a numerical value of the reflectance factor of a sample with respect to blue light. The instrument has a light source that shines onto a piece of paper at 45 degrees with receiving optics that view that same spot from zero degrees, perpendicular to the sample.

Dry Pick Resistance (IGT)

This test measures the ability of the paper surface to accept the transfer of ink without picking. The test is carried out on an A2 type printability tester, commercially available from IGT Reprotest BV. Coated paper strips are printed with inked aluminum disks at a printing pressure of 36 N with a pendulum drive system. Tack-rated inks are utilized and selected depending on the strength of the paper. After the printing is completed, the distance where the coating begins to show picking is marked under a stereomicroscope. The marked distance is then transferred into the IGT velocity curve and the velocities in cm/s are read from the corresponding drive curve. Higher velocity values correlate to higher resistance to dry pick.

Wet Pick Resistance (Prufbau)

This test measures the ability of the paper surface to accept the transfer of a film of water prior to a layer of ink without picking as a result of a weakening of the coated layer. The test is carried out on the Prufbau MZII Printability tester (Munchen, Germany). Coated paper strips are printed with inked, rubber-covered disks at a printing pressure of 300 N. Tack rated inks are utilized and selected depending on the strength and type of paper. For each paper strip, an area of prewetted coating is printed alongside a dry area. Coatings that are weakened by the film of water will generally pick worse than those that have good wet strength. Higher brightness values correlate to a whiter sample that is evidence of coating pick and a lower resistance to picking.

Paper Roughness

The roughness of the coated paper surface is measured with a Parker Print Surf Roughness Meter manufactured by Testing Machinery Incorporated (Messmer & Buchel) model M-590. A sample sheet of coated paper is clamped between a cork-melinex platen and a measuring head at a clamping pressure of 1,000 kPa. Compressed air is supplied to the instrument at 400 kPa and the leakage of air between the measuring head and the coated paper surface is measured. A higher number indicates a higher degree of roughness of the coated paper surface. An instrument calculation is performed that converts the instrument value into a surface roughness value.

Porosity

Paper porosity is measured using a Gurley Porosity Tester, Model 4200 manufactured by Gurley Precision Instruments. This method is utilized to determine the porosity of a sheet as an amount of air forced through a sheet of paper for a set amount of time. The gas permeability of paper is the ability of the sheet to allow the flow of a gas or vapor through the structure of the sheet under a pressure gradient. Values are reported as the length of time required to lose 10 cubic centimeters of air.

Paper Stiffness

Paper stiffness is measured using the Gurley Stiffness Tester Model No. 4171. A paper sample is attached to a clamp, and is moved past a vane arm. This vane will deflect and indicate a raw scale reading, which is then converted to a Gurley stiffness number. Average and standard deviation of the Gurley stiffness number.

Materials

The following materials are used in the examples.

Starch A: native waxy corn starch (Douglas Waxy Pearl Starch available from Penford Products, Cedar Rapids, Iowa, USA), dry powder containing about 11% moisture.

Starch B: native waxy corn starch (Merizet 300 available from Tate and Lyle, Koog, Netherlands), dry powder containing about 11% moisture.

Starch C: hydroxyethyl ether derivatized corn starch, (PG 290 available from Penford Products, Cedar Rapids, Iowa, USA) dry powder containing about 11% moisture.

Glyoxal: crosslinking agent (EKA RC 5650 available from Eka Chemicals Inc., Marietta, Ga., USA) (used in comparative examples).

Carbonate: dispersion of calcium carbonate with particle size of 90%<2 μm in water (Hydrocarb® 90 available from Pluess-Stauffer, Oftringen, Switzerland), 77% solids.

Clay: dispersion of No. 1 high brightness kaolin clay with particle size of 90-96%<2 μm in water (Hydrafine® 90 available from KaMin Performance Materials, Macon, Ga., USA), 71% solids.

Latex: carboxylated styrene-butadiene latex (CP 638NA available from The Dow Chemical Company, Midland, Mich., USA), 50% solids in water.

Thickener: acrylate-based emulsion copolymer (Alcogum L229 available from Akzo Nobel, Chicago, Ill. USA), 25% solids in water.

Equipment

The extruder is a laboratory scale, 30-mm diameter, 38-diameters in length, Werner & Pfleiderer co-rotating, self wiping twin screw extruder with a barrel formed from 12 barrel sections and 9 temperature control zones. The extruder screw design is set up to provide kneading and shearing of the contents early in the extruder and distributive mixing late in the extruder. This machine has multiple injection points along the length of the machine for liquid injection. The unit has a 11.2-kW motor with a maximum screw speed of 500 rpm.

Extrusion Procedure

The starch is fed into the feed port (barrel 1) using a K-Tron model KT-20 twin-screw loss-in-weight feeder. The material is conveyed to barrel 3 where water is added to the starch to bring the solids content down to the desired level. The center section of the extruder is designed with several stages of closely intermeshed kneading elements that provide dispersive and distributive mixing action to the starch/water mixture. Depending on the operating conditions, electric heaters on each barrel section are used to heat the contents of the machine during this part of the operation. At barrel 8, additional water can be added to bring the final solids content to the desired exit concentration. The mixing elements at the end of the machine provide additional distributive mixing to the contents with the intent of creating a stable dispersion at the end of the process.

The water feed is supplied by two ISCO dual-pump positive displacement pump units (model D-500 and D-1000) in parallel. The dual-pump configuration with controller enables continuous operation of the pumps from a larger supply container of distilled water. The water is injected into the extruder with standard injection nozzles for the 30-mm twin-screw extruder. A pressure gauge is located at each injection point to measure the injection pressure.

The feed starch is metered into the system with the loss-in-weight feeder. The feeder is located immediately above the feed port (3-inches above feed port) to minimize the dusting of the powder dropping from the feeder.

A back pressure regulator valve, A GO Regulator Inc., model BP60_1A11QGL1S1E regulator valve (0-2000 psig) is attached on the outlet of the extruder. The purpose of the valve to control the discharge pressure of the extruder. This valve also ensures that water in the system does not flash into steam until it exits the end of the extruder. The valve can be used to control the level of fill in the extruder.

More specifically, the following process is employed.

1) Dry feed the starch into barrel 1 of the extruder (primary feed port).

2) Add water at barrel 3 to reduce the starch solids to the desired load solids.

3) Add additional water at barrel 8 or later to reduce the starch solids to the desired extrudate solids.

4) Collect the extrudate and allow it to cool down.

Once flow is established, the back pressure regulator valve is slowly closed until the desired degree of extruder filling is reached. The degree of extruder filling is verified by observing the gauge pressure at the liquid injection points at barrels 3 and 8. The extruder will operate in a partially filled manner unless a restriction is placed in the flow path. As the valve is closed, the pressure indicators at barrel 8 and then barrel 3 increase, which indicates the extruder completely fills from the end of the machine (back pressure regulator valve location) up to the injection point of the liquid pump systems.

Example 1

Starch A is fed to the extruder using the Extrusion Procedure. Details are given in Table 1.

Ccomparative Experiment 2

Not an Embodiment of the Invention

Example 1 is repeated except that 1 part, based on 100 weight parts dry starch, of Glyoxal crosslinking agent is added to the extruder at barrel 3. Details and results are given in Table 1.

TABLE 1

| Starch Dispersion Result: Wet Starch Properties and Stability | | |
|---|---|---|
| | EX. 1—EXTRUDED STARCH W/O CROSSLINKER 46%/56% LOAD SOLIDS | C EX. 2—EXTRUDED STARCH WITH CROSSLINKER* 46%/56% LOAD SOLIDS |
| Extruder Die Pressure (bar) | 8.3 | 8.4 |
| Molecular weight - Mn | 19700/24000 | 9200/104000/ |
| Molecular weight - Mw | 166000/131000 | 43100/313000 |
| Viscosity (cps) - at 1 day (100 rpm #4 spindle) | 456/432 | 1314/354 |
| Viscosity (cps) - 1 week (100 rpm #4 spindle) | 238/360 | 152/430 |
| Solids | 20.6%/19.2% | 20.3%/21.6% |
| Stability - settling at 4 weeks | Stable | Stable |
| Stability - settling at 10 weeks | Stable | Stable |
| Bacteria/mold - at 1 week | None/none | None/slight |
| Bacteria/mold - at 10 weeks | None/none | Heavy/heavy |
| Starch Color - at 4 weeks | White | Tan |
| Starch Color - at 10 weeks | White | Cream white |

Example 3 and Comparative Experiment 4

Not an Embodiment of the Invention

Paper coatings formulations are prepared based on 100 parts total pigment on a dry basis. Specifically, a pigment slip is prepared using 60 parts of the Carbonate and 40 parts of the Clay described hereinabove. This is followed by the addition of 6 parts Latex and 6 parts of each extruded starch of Table 1. Finally, 0.2 parts of synthetic Thickener are utilized to raise the low shear viscosity of the coating in preparation for coating. The pH is adjusted to 8.5 with 20% aqueous sodium hydroxide and the solids are adjusted with water to 61.0%.

Coated paper is prepared using the paper coating formulations in the following process. A laboratory bench blade coater (manufactured by Enz Technik AG, Giswil, Switzerland) is utilized to apply the prepared formulations. The blade metering pressure is set to apply 8 lbs/3300 sq ft and the resulting coating is dried using infrared and air flotation drying to reach a target moisture of 4.5%. The resulting samples are cut into sheets and then lab calendered using a Beloit Wheeler Laboratory Calender Model 753 (manufactured by Beloit Manhattan, Otsego, Mich., USA) using 3 nips at 150° F. and a pressure loading equivalent to 800 pli.

The properties of the final coated papers are given in Table 2.

TABLE 2

Physical Testing Results: Formulation and coated paper properties (6 parts latex/6 parts starch)

|  | EXTRUDED STARCH W/O CROSSLINKER 46%/56% load solids | EXTRUDED STARCH WITH CROSSLINKER 46%/56% load solids |
|---|---|---|
| Viscosity (cps) - 20 rpm #4 spindle | 4600/2970 | 7110/4850 |
| Sheet Gloss | 60.0/58.0 | 55.8/55.0 |
| Brightness | 87.5/87.6 | 87.5/87.4 |
| Roughness | 1.36/1.34 | 1.52/1.45 |
| Porosity (sec) | 334/285 | 286/338 |
| Dry Pick (fpm) | 245/277 | 258/272 |
| Wet Pick | 36.8/37.9 | 33.9/35.8 |
| Stiffness CMD | 180/174 | 182/180 |

As is shown in Table 1, the starch dispersion of Example 1 provides lower formulation viscosity, significantly higher sheet gloss and lower roughness versus the starch dispersion of Comparative Experiment 2 that is extruded in the presence of crosslinker. Equivalent brightness, porosity, stiffness, wet pick and dry pick strength are observed. These results surprisingly indicate that the performance of starch dispersions can be improved without the use of a crosslinker.

What is claimed is:

1. A process for the preparation of a dispersion of starch in a hydroxylic liquid, the process comprising:
   introducing a feed starch and aft hydroxylic liquid selected from water, an alcohol, and mixtures thereof, to an extruder, and
   applying shear forces in the extruder to the starch and the liquid in the substantial absence of a cross-linker under conditions sufficient to prepare a stable dispersion of starch particles in the hydroxylic liquid, with the proviso that the dispersion has a solids content of at least 15%.

2. The process of claim 1 wherein the dispersion is a very stable dispersion.

3. The process of claim 1 wherein the number average particle size of the starch particles in the dispersion is from about 0.02 to about 0.4 microns.

4. The process of claim 1 further comprising a step wherein at least part of the hydroxylic liquid of the dispersion is removed.

5. The process of claim 1 wherein the SME is at least about 400 J/g.

6. The process of claim 1 wherein the extruder is a co-rotating, self wiping twin screw extruder.

7. The process of claim 1 conducted in the substantial absence of a surfactant.

8. The process of claim 1 wherein the number average particle size of the starch particles in the dispersion is from about 0.05 to about 0.2 microns.

9. The process of claim 1 wherein the Brookfield viscosity of the dispersion, measured 7 days after the dispersion is produced, is not more than about 1,000 cps.

10. A starch dispersion prepared by the process of claim 1.

11. A coating composition comprising the starch of claim 10.

12. The composition of claim 11 wherein the coating composition is a paper coating composition.

* * * * *